US012537451B2

(12) United States Patent
Castorina et al.

(10) Patent No.: US 12,537,451 B2
(45) Date of Patent: Jan. 27, 2026

(54) CONTROLLER FOR A BUCK-BOOST SWITCHING CONVERTER WITH OVERCURRENT AND NULL-CURRENT DETECTION AND METHOD FOR CONTROLLING A BUCK-BOOST SWITCHING CONVERTER

(71) Applicant: STMicroelectronics S.r.l., Agrate Brianza (IT)

(72) Inventors: Stefano Castorina, Milan (IT); Elena Brigo, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 195 days.

(21) Appl. No.: 18/345,525

(22) Filed: Jun. 30, 2023

(65) Prior Publication Data

US 2024/0072670 A1    Feb. 29, 2024

(30) Foreign Application Priority Data

Aug. 30, 2022 (IT) .......................... 102022000017814

(51) Int. Cl.
*H02M 3/158* (2006.01)
*H02M 1/00* (2007.01)
*H02M 1/32* (2007.01)

(52) U.S. Cl.
CPC ....... *H02M 3/1582* (2013.01); *H02M 1/0009* (2021.05); *H02M 1/32* (2013.01)

(58) Field of Classification Search
CPC .. H02M 3/158; H02M 3/1582; H02M 1/0009; H02M 1/32
See application file for complete search history.

(56) References Cited

U.S. PATENT DOCUMENTS

| | | | | |
|---|---|---|---|---|
| 6,127,814 | A | * 10/2000 | Goder | ................ H02M 3/1588 323/282 |
| 9,490,629 | B1 | * 11/2016 | Chakraborty | .......... H02H 9/025 |
| 11,362,590 | B1 | 6/2022 | Houston et al. | |
| 2006/0152203 | A1 | * 7/2006 | Perry | ................ H02M 3/33507 323/283 |
| 2009/0212851 | A1 | * 8/2009 | Yamashita | ............ H02M 3/158 327/538 |
| 2010/0194367 | A1 | * 8/2010 | Lund | ................ H02M 3/33523 323/284 |

(Continued)

FOREIGN PATENT DOCUMENTS

CN    110350773 A    10/2019

*Primary Examiner* — Gustavo A Rosario-Benitez
(74) *Attorney, Agent, or Firm* — Slater Matsil LLP (57) ABSTRACT

A controller for a buck-boost switching converter, which includes an inductor and a shunt resistor and is coupled to a load which draws a load current, includes a control circuit which performs charge and discharge cycles of the inductor. A first comparator stage generates a first signal which is indicative of a direction of the resistor current during the charge and discharge cycles. A low-pass filtering circuit generates a filtered electrical quantity based on a voltage on the shunt resistor during the charge and discharge cycles. A second comparator stage generates a second signal indicative of a comparison between the filtered electrical quantity and a reference electrical quantity. A detection stage detects the occurrence of an overcurrent in the load based on the second signal.

20 Claims, 7 Drawing Sheets

(56) References Cited

U.S. PATENT DOCUMENTS

| | | | |
|---|---|---|---|
| 2013/0093404 A1* | 4/2013 | Park | H02M 3/158 |
| | | | 323/273 |
| 2013/0162171 A1 | 6/2013 | Ishii et al. | |
| 2017/0194858 A1* | 7/2017 | Villot | H02M 1/32 |
| 2017/0257031 A1* | 9/2017 | Shao | H02M 3/1582 |
| 2018/0316181 A1* | 11/2018 | Furuya | H02H 7/1213 |
| 2018/0366970 A1 | 12/2018 | Zhou et al. | |
| 2019/0086462 A1* | 3/2019 | Sugisawa | H02M 3/1582 |
| 2019/0305666 A1 | 10/2019 | Yang et al. | |
| 2022/0083112 A1* | 3/2022 | Konduru | H02M 1/0019 |

* cited by examiner

CONTROLLER FOR A BUCK-BOOST SWITCHING CONVERTER WITH OVERCURRENT AND NULL-CURRENT DETECTION AND METHOD FOR CONTROLLING A BUCK-BOOST SWITCHING CONVERTER

CROSS-REFERENCE TO RELATED APPLICATIONS

This application claims priority to Italian Application No. 102022000017814, filed on Aug. 30, 2022, which application is hereby incorporated herein by reference.

TECHNICAL FIELD

The present disclosure generally relates to a—controller for a buck-boost switching converter with overcurrent and null-current detection, as well as to a corresponding method for controlling a buck-boost converter.

BACKGROUND

As is known, so-called DC-DC converters, also known as switching converters, are nowadays available which allow generating, from a DC input voltage, an output voltage, which is of the DC-type, may be higher or lower than the input voltage and may be used to supply a load.

SUMMARY

According to one or more embodiments of the present disclosure, a controller and a control method are provided.

In at least one embodiment, a controller for a buck-boost switching converter is provided. The buck-boost switching converter includes an input node configured to receive an input voltage and an output node configured to couple to a load which draws a load current. The buck-boost switching converter further includes an inductor, a capacitor, a shunt resistor, a first and a second top switch and a first and a second bottom switch. The first top switch and the first bottom switch are connected in series at a first internal node, the second top switch and the second bottom switch are connected in series at a second internal node, the inductor is coupled to the first and the second internal nodes, the first and the second top switches are coupled respectively to the input node and a first terminal of the shunt resistor, a second terminal of the shunt resistor is coupled to the output node, and the capacitor is coupled to the output node. The controller includes: a control circuit configured to control the first and the second top switches and the first and the second bottom switches to perform charge and discharge cycles of the inductor, during which the inductor is traversed by an inductor current, and the shunt resistor is subject to a voltage and is traversed by a resistor current, the resistor current having an average value that is equal to the load current and is equal to the inductor current at least during the discharges of the inductor; a first comparator configured to couple to the shunt resistor and to generate a first signal indicative of a direction of the resistor current, wherein the control stage is configured to control the first and the second top switches and the first and the second bottom switches based on the first signal; and an overcurrent detection circuit. The overcurrent detection circuit includes: a low-pass filtering circuit configured to couple to the shunt resistor and to generate a filtered electrical quantity based on the voltage at the shunt resistor; a second comparator coupled to the low-pass filtering circuit and configured to generate a second signal indicative of a comparison between the filtered electrical quantity and a reference electrical quantity; and a detection circuit configured to detect an occurrence of an overcurrent in the load based on the second signal.

In at least one embodiment, an electronic system is provided that includes a buck-boost switching converter and a controller. The buck-boost switching converter includes: an input node configured to receive an input voltage and an output node configured to couple to a load which draws a load current; an inductor; a capacitor; a shunt resistor; a first and a second top switch and a first and a second bottom switch, the first top switch and the first bottom switch being connected in series at a first internal node, the second top switch and the second bottom switch being connected in series at a second internal node, the inductor being coupled to the first and the second internal nodes, the first and the second top switches being coupled respectively to the input node and a first terminal of the shunt resistor, a second terminal of the shunt resistor being coupled to the output node, the capacitor being coupled to the output node. The controller includes: a control circuit configured to control the first and the second top switches and the first and the second bottom switches to perform charge and discharge cycles of the inductor, during which the inductor is traversed by an inductor current, and the shunt resistor is subject to a voltage and is traversed by a resistor current, the resistor current having an average value that is equal to the load current and equal to the inductor current at least during the discharges of the inductor; a first comparator configured to couple to the shunt resistor and to generate a first signal indicative of a direction of the resistor current, wherein the control stage is configured to control the first and the second top switches and the first and the second bottom switches based on the first signal; and an overcurrent detection circuit. The overcurrent detection circuit includes: a low-pass filtering circuit configured to couple to the shunt resistor and to generate a filtered electrical quantity based on the voltage at the shunt resistor; a second comparator coupled to the low-pass filtering circuit and configured to generate a second signal indicative of a comparison between the filtered electrical quantity and a reference electrical quantity; and a detection circuit configured to detect an occurrence of an overcurrent in the load, based on the second signal.

In at least one embodiment, a method for controlling a buck-boost switching converter is provided. The buck-boost switching converter includes an input node configured to receive an input voltage and an output node configured to couple to a load which draws a load current. The buck-boost switching converter further includes an inductor, a capacitor, a shunt resistor, a first and a second top switch and a first and a second bottom switch, the first top switch and the first bottom switch being connected in series at a first internal node, the second top switch and the second bottom switch being connected in series at a second internal node, the inductor being coupled to the first and the second internal nodes, the first and the second top switches being coupled respectively to the input node and to a first terminal of the shunt resistor, a second terminal of the shunt resistor being coupled to the output node, the capacitor being coupled to the output node. The control method includes: controlling the first and the second top switches and the first and the second bottom switches to perform charge and discharge cycles of the inductor, during which the inductor is traversed by an inductor current, the shunt resistor is subject to a voltage and is traversed by a resistor current, the resistor current having an average value that is equal to the load current and is equal to the inductor current at least during the discharges of the inductor; generating a first signal indicative of a direction of the resistor current, wherein controlling the first and the second top switches and the first and the second bottom switches comprises controlling the first and the second top switches and the first and the second bottom switches based on the first signal; generating a filtered electrical quantity based on the voltage at the shunt resistor, by a low-pass filtering circuit; generating a second signal indicative of a comparison between the filtered electrical quantity and a reference electrical quantity; and detecting an occurrence of an overcurrent in the load based on the second signal.

BRIEF DESCRIPTION OF THE DRAWINGS

For a more complete understanding of one or more embodiments of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
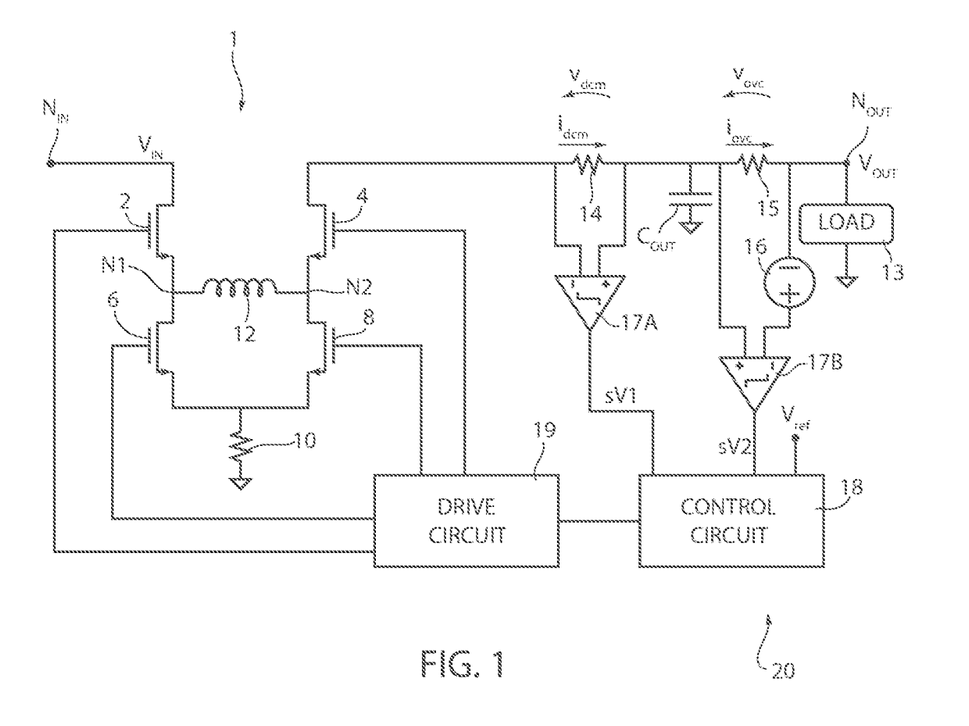
FIG. 1 shows a circuit diagram of a converter.

FIG. 1 shows a converter 1 which comprises four NMOS transistors, which are for example power MOSFET transistors formed in corresponding integrated circuits, and which are hereinafter referred to as, respectively, the first and the second top transistors 2, 4 and the first and the second bottom transistors 6, 8.

The source terminals of the first and the second top transistors 2, 4 are respectively connected to the drain terminals of the first and the second bottom transistors 6, 8, so as to form respectively a first and a second internal node N1, N2. In practice, the first top transistor 2 and the first bottom transistor 6 are connected in series; similarly, the second top transistor 4 and the second bottom transistor 8 are connected in series.

The source terminals of the first and the second bottom transistors 6, 8 are connected to a first terminal of a resistor 10, whose second terminal is grounded. An inductor 12 is also present, whose terminals are respectively connected to the first and the second internal nodes N1, N2. As a whole, the first and the second top transistors 2, 4 and the first and the second bottom transistors 6, 8 are arranged in a bridge configuration.

The drain terminal of the first top transistor 2 forms an input node $N_{IN}$ and is for receiving an input voltage $V_{IN}$ of the DC-type. The drain terminal of the second first top transistor 4 is connected to a first terminal of a first shunt resistor 14, whose second terminal is connected to a first terminal of a capacitor $C_{OUT}$, whose second terminal is grounded. The first terminal of the capacitor $C_{OUT}$ is also connected to a first terminal of a second shunt resistor 15 (which has a resistance of the order of mΩ), while the second terminal of the second shunt resistor 15 forms an output node $N_{OUT}$, having the load 13 connected thereto. In practice, the load 13 is connected between the output node $N_{OUT}$ and the ground.

The converter 1 further comprises a voltage generator 16 and a first and a second comparator 17A, 17B. In particular, the negative input and the positive input of the first comparator 17A are connected respectively to the first and the second terminals of the first shunt resistor 14. The negative terminal and the positive terminal of the voltage generator 16 are connected respectively to the second terminal of the second shunt resistor 15 and to the negative input of the second comparator 17B, whose positive input is connected to the first terminal of the second shunt resistor 15.

The converter 1 also comprises a control circuit 18. The outputs of the first and the second comparators 17A, 17B are connected to the control circuit 18, which also receives at input a reference voltage $V_{ref}$ of the DC-type.

In use, indicating with $i_{dcm}$ the instantaneous current that flows in the first shunt resistor 14 in the direction of the capacitor $C_{OUT}$ and indicating with $R_{dcm}$ the resistance of the first shunt resistor 14, on the output of the first comparator 17A, a signal sV1 is present indicative of the fact that the voltage $v_{dcm}$ (equal to $i_{dcm}*R_{dcm}$) is positive or negative; the signal sV1 is therefore a logic signal (binary), indicative of the direction of the current $i_{dcm}$.

The voltage generator 16 generates, between its positive terminal and its negative terminal, a (DC) voltage $V_{th}$, which for example may be adjusted so as to be set equal to a desired value. Consequently, indicating with $i_{ovc}$ the instantaneous current that flows in the second shunt resistor 15 in the direction of the load 13 and indicating with $R_{ovc}$ the resistance of the second shunt resistor 15, a signal sV2 of the logic type is present on the output of the second comparator 17B, indicative of the fact that the voltage $V_{ovc}$ (equal to $i_{ovc}*R_{ovc}$) is higher or lower than the voltage $V_{th}$. The signals sV1 and sV2 are provided to the control circuit 18.

The gate terminals of the first and the second top transistors 2, 4 and of the first and the second bottom transistors 6, 8 are connected to a drive circuit 19, which is also connected to the control circuit 18. The resistor 10, first and second comparators 17A, 17B, the control circuit 18 and the drive circuit 19 form a controller 20 (which may be referred to herein as control module 20) of the converter 1.

Figure 2A:
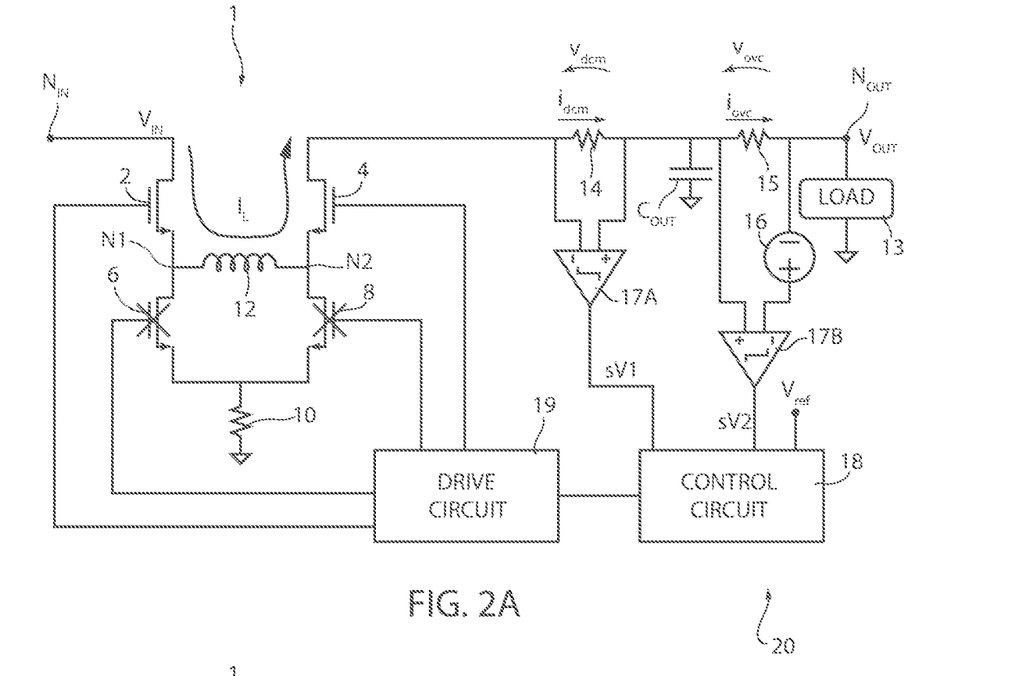
FIGS. 2A and 2B show circuit diagrams of the converter shown in FIG. 1, when the converter operates in a first operating mode.
Figure 2B:
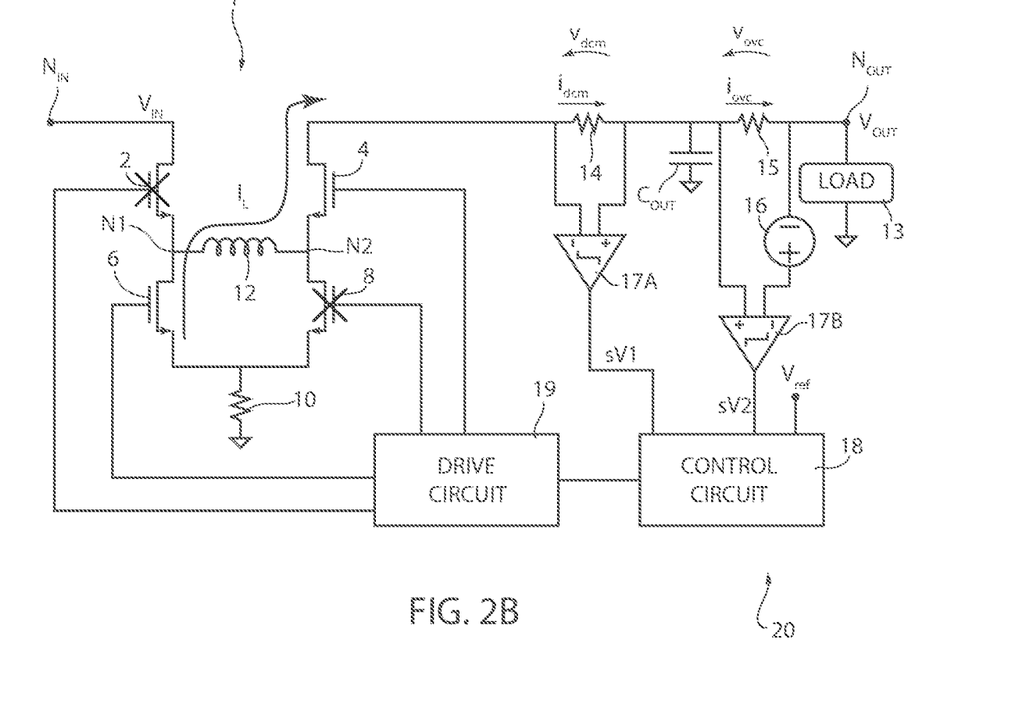

The control module 20 may control the first and the second top transistors 2, 4 and the first and the second bottom transistors 6, 8 so that the converter 1 operates in a first operating mode, shown schematically in FIGS. 2A and 2B.

In detail, in the first operating mode, the second top transistor 4 is always on, so as to couple the second internal node N2 to the first terminal of the first shunt resistor 14. The second bottom transistor 8 is instead off, so as to decouple the second internal node N2 from the resistor 10, and therefore from the ground.

The first top transistor 2 and the first bottom transistor 6 are instead controlled by the control module 20 in an alternating manner. In particular, for each time period T, also known as switching period T, the first top transistor 2 is maintained on for a time interval $T_{ON}$, while the first bottom transistor 6 is off, as shown in FIG. 2A. In this manner, a current $I_L$, which grows linearly over time, flows in the inductor 12; in other words, the inductor 12 is progressively loaded. The current $I_L$ also flows in the first shunt resistor 14 and, in part, charges the output capacitor $C_{OUT}$ and, in part, goes to the load 13 (after traversing the second shunt resistor 15). During the time interval $T_{ON}$, energy is then stored in the inductor 12 and in the output capacitor $C_{OUT}$.

At the end of the time interval $T_{ON}$, the first top transistor 2 is turned off, while the first bottom transistor 6 is turned on, this configuration remaining for a time interval $T_{OFF}$, until the end of the time period T and being shown in FIG. 2B; ideally it is $T=T_{ON}+T_{OFF}$. In this configuration, the current $I_L$ flows in the first bottom transistor 6, as well as in the inductor 12, in the second top transistor 4 and in the first shunt resistor 14; subsequently, a part of the current $I_L$ flows in the output capacitor $C_{OUT}$, while a part flows in the second shunt resistor 15 and in the load 13. Furthermore, in this configuration, the inductor 12 and the output capacitor $C_{OUT}$ are gradually discharged; in particular, the current $I_L$ is gradually discharged, possibly until it is canceled out, as explained in greater detail below.

In practice, in the first operating mode, the converter 1 behaves as a so-called buck converter, therefore hereinafter the first operating mode is referred to as buck mode. The first inductor 12 is therefore subject to charge and discharge cycles, with energy transfer on the load 13.

Figure 3A:
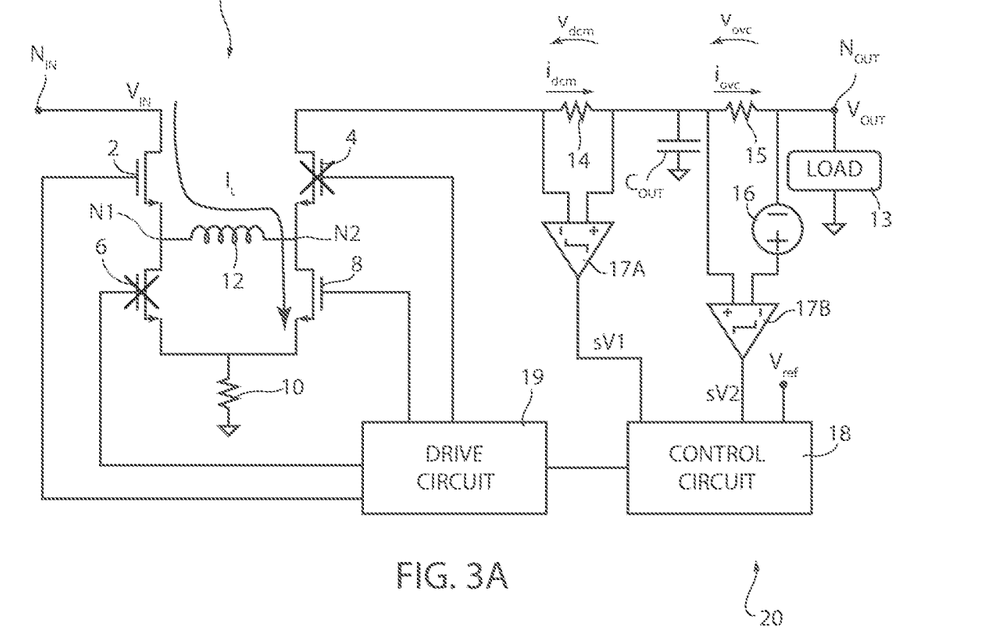
FIGS. 3A and 3B show circuit diagrams of the converter shown in FIG. 1, when the converter operates in a second operating mode.
Figure 3B:
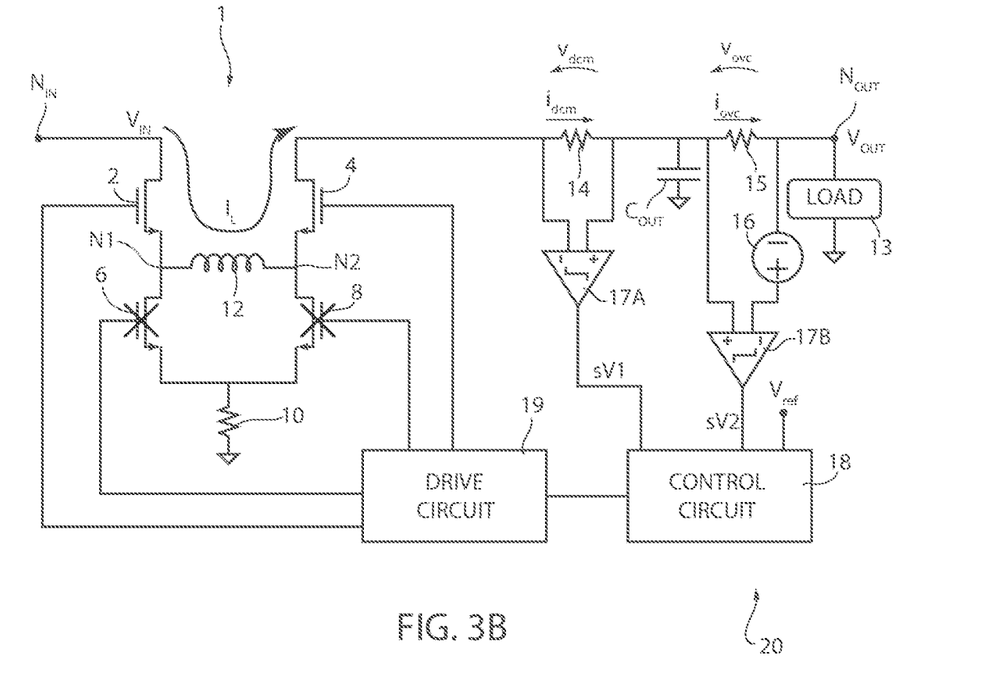

The control module 20 may also control the first and the second top transistors 2, 4 and the first and the second bottom transistors 6, 8 so that the converter 1 operates in a second operating mode, shown schematically in FIGS. 3A and 3B.

In detail, in the second operating mode, the first top transistor 2 is always on, so as to couple the first internal node N1 to the input node $N_{IN}$. The first bottom transistor 6 is instead off, so as to decouple the first internal node N1 from the resistor 10, and therefore from the ground.

The second top transistor 4 and the second bottom transistor 8 are instead controlled by the control module 20 in an alternating manner. In particular, for each time period T' (again referred to as switching period), the second bottom transistor 8 is maintained on for a time interval $T'_{ON}$, while the second top transistor 4 is off, as shown in FIG. 3A; in this manner, a current $I_L$, which grows linearly over time and is directed towards ground through the resistor 10, flows in the inductor 12. The inductor 12 then undergoes a charging process. The current $I_L$ also flows in the first top transistor 2 and in the second bottom transistor 8.

At the end of the time interval $T'_{ON}$, the second bottom transistor 8 is turned off, while the second top transistor 4 is turned on, this configuration remaining for a time interval $T'_{OFF}$, until the end of the time period T' and being shown in FIG. 3B; ideally it is $T'=T'_{ON}+T'_{OFF}$. In this configuration, the current $I_L$, after traversing the second top transistor 4 and the first shunt resistor 14, in part charges the output capacitor $C_{OUT}$, which will provide current to the load 13 during the successive time interval $T'_{ON}$, and in part goes to the load 13 (after traversing the second shunt resistor 15), gradually reducing, possibly until cancelling out, as explained in greater detail below.

In practice, in the second operating mode, the converter 1 behaves as a so-called boost converter, therefore hereinafter the second operating mode is referred to as boost mode. Also in this case, the inductor 12 is subject to charge and discharge cycles, with energy transfer on the load 13.

The converter 1 is therefore a buck-boost converter; consequently, referring to the voltage $V_{OUT}$ to indicate the voltage present, net of the ripple, on the output node $N_{OUT}$, and therefore on the load 13, the converter 1 is capable of obtaining a ratio $V_{OUT}/V_{IN}$ alternatively equal to the ratio implemented by the buck converters or to the ratio implemented by the boost converters.

Furthermore, the control module 20 may alternate periods wherein the converter 1 operates in buck mode with periods wherein the converter 1 operates in boost mode, so as to obtain a ratio $V_{OUT}/V_{IN}$ approximately equal to one.

In greater detail, the control circuit 18 determines the durations of the time intervals $T_{ON}$, $T_{OFF}$ and $T'_{ON}$, $T'_{OFF}$ on the basis of the voltage on the resistor 10, and therefore on the basis of the current flowing in the resistor 10, which coincides with the current $I_L$ flowing in the inductor 12, and also on the basis of the voltage $V_{OUT}$. To this end, the control circuit 18 receives the aforementioned reference voltage $V_{ref}$ and operates in closed loop in such a way that the voltage $V_{OUT}$ depends on the reference voltage $V_{ref}$. Furthermore, although not shown, the control circuit 18 is connected to the resistor 10.

In greater detail, the control circuit 18 may for example implement a control scheme of the converter 1 of the so-called current-mode type, wherein the resistor 10 allows detecting the current $I_L$, and therefore generating a first control quantity which is a function of the current $I_L$, which is compared with a second control quantity, which is indicative of the difference present between the voltage $V_{OUT}$ and the reference voltage $V_{ref}$, and wherein the duty cycle (understood as the ratio between $T_{ON}$, or $T'_{ON}$, and T) is controlled on the basis of the outcome of the comparison, in such a way that the inductor 12 acts as a voltage-driven current generator, since the average value of the current $I_L$ is a function of the difference present between the voltage $V_{OUT}$ and the reference voltage $V_{ref}$. Alternatively, the control circuit 18 may implement a control scheme of the converter 1 of the so-called voltage-mode type, in which case the duty cycle is controlled only on the basis of the difference present between the voltage $V_{OUT}$ and the reference voltage $V_{ref}$, without implementing a further control loop wherein the control variable is formed by the current $I_L$ of the inductor 12. In both cases, by varying the reference voltage $V_{ref}$, a corresponding variation of the voltage $V_{OUT}$ is obtained, i.e. it occurs that, given a value of the reference voltage $V_{ref}$, the converter 1 acts in such a way that voltage $V_{OUT}$ assumes a corresponding average value.

Regardless of the details of the control scheme implemented by the control circuit 18, the converter 1 may operate alternatively in the so-called "continuous current mode" (CCM) or in the so-called "discontinuous current mode" (DCM).

Figure 4:
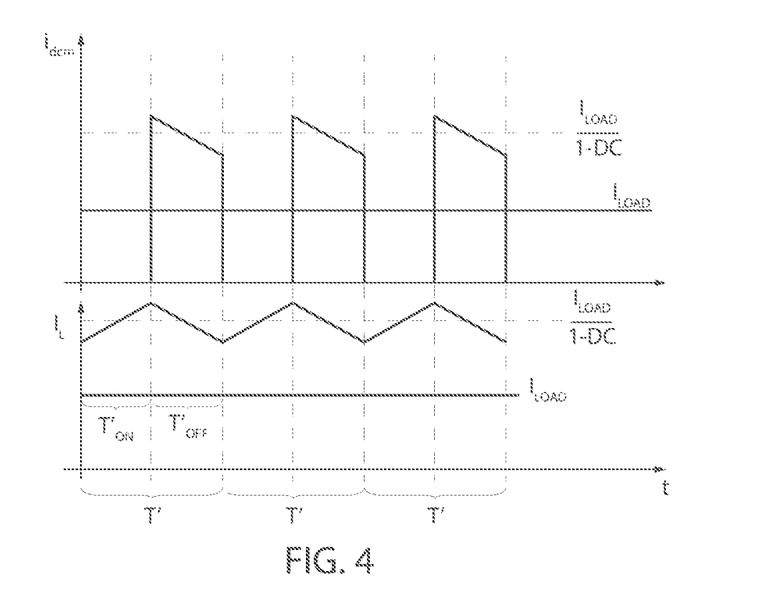
FIGS. 4, 5 and 7 show trends over time of electrical quantities.

In particular, when the converter 1 operates in the boost mode, in case the "continuous current mode" is implemented, the trends over time of the current $I_L$ and of the current $i_{dcm}$ are of the type shown in FIG. 4. In detail, during each time period T', the current $I_L$ does not cancel out; furthermore, as previously explained, during each time period T' it occurs that the current $I_L$ increases linearly in the respective time interval $T'_{ON}$ and decreases linearly in the respective time interval $T'_{OFF}$. The average value of the current $I_L$ is equal to $I_{LOAD}/(1-DC)$, with $I_{LOAD}$ indicating the current drawn by the load 13, which is assumed to be constant, while DC indicates the duty cycle, i.e. the ratio $T'_{ON}/T'$. Furthermore, the current $i_{dcm}$ is null during each time interval $T'_{ON}$ and is equal to the current $I_L$ during each time interval $T'_{OFF}$. The current $i_{ovc}$ is equal to the current $I_{LOAD}$ throughout the duration of each time period T'.

Figure 5:
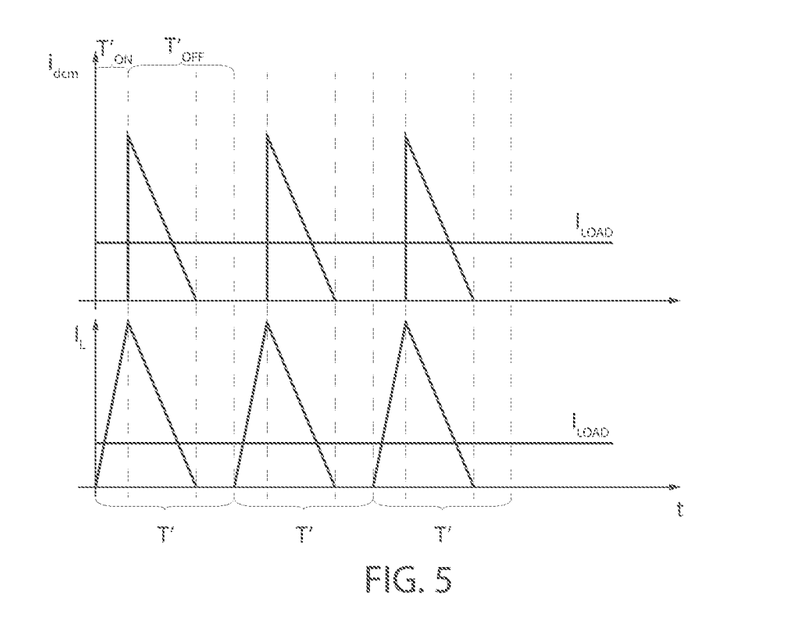

When the converter 1 operates as a boost converter in the "discontinuous current mode", the trends over time of the current $I_L$ and of the current $i_{dcm}$ are of the type shown in FIG. 5. In particular, during each time period T' it occurs that the current $I_L$ increases linearly in the respective time interval $T'_{ON}$ and decreases linearly in the respective time interval $T'_{OFF}$, until it cancels out. In addition, the current $i_{dcm}$ is null during each time interval $T'_{ON}$ and is equal to the current $I_L$ during each time interval $T'_{OFF}$. The current $i_{ovc}$ is equal to the current $I_{LOAD}$ throughout the duration of each time period T'.

On the basis of FIGS. 4 and 5, it is noted how the current $i_{ovc}$ is particularly suitable for being used to detect possible overcurrents occurring of the load 13, since the current $i_{ovc}$ is precisely equal to the current $I_{LOAD}$. In particular, on the basis of the signal sV2, the control circuit 18 may generate a signal indicative of an average over time of the difference between the voltage $v_{ovc}$ and the voltage $V_{th}$, and therefore of the difference between the current $i_{ovc}$ (therefore, the current $I_{LOAD}$) and an overcurrent threshold equal to $V_{th}/R_{ovc}$. The control circuit 18 may therefore detect the occurrence of an overcurrent on the load 13, on the basis of the aforementioned signal indicative of an average over time of the difference between the voltage $v_{ovc}$ and the voltage $V_{th}$. In other words, the control circuit 18 implements a processing of the current $i_{ovc}$ which is characterized by a time constant greater than the so-called switching frequency (the latter being equal to the inverse of the switching period T' and typically being of the order of hundreds of kHz), in order to reduce the likelihood of false positives.

Furthermore, when the converter 1 operates as a boost converter in the "discontinuous current mode", the control circuit 18 may control the turning on and off of the second top transistor 4 and the second bottom transistor 8 on the basis of the signal sV1. In particular, in order to turn off the second top transistor 4 with a reduced delay with respect to the time instant wherein the current $I_L$ cancels out, the control circuit 18 precisely detects the cancellation of the current $I_L$ on the basis of the signal sV1 and subsequently it turns off the second top transistor 4, with an extremely reduced reaction time (even lower than 1 μs).

In view of the above, it appears that the implementation of an overcurrent detection mechanism and of a mechanism capable of allowing control in DCM mode requires or otherwise relies on the presence of two resistors, which however occupy space and dissipate power; furthermore, the package of the control module needs corresponding pairs of pins. In various embodiments, the present disclosure provides a controller and control methods which at least partially overcome the drawbacks mentioned above.

The control module in accordance with various embodiments of the present disclosure is inspired by an observation by the Applicant, who observed that, for each switching period, the average value of the current $i_{dcm}$ is equal to the current $i_{ovc}$, which in turn is equal to the current $I_{LOAD}$ drawn by the load 13, since the average current that flows in the output capacitor $C_{OUT}$ is null, in steady state conditions. Consequently, the current $i_{dcm}$ that flows in the first shunt resistor 14 may be used to carry out the detection of overcurrents in the load 13, as explained below.

Figure 6:
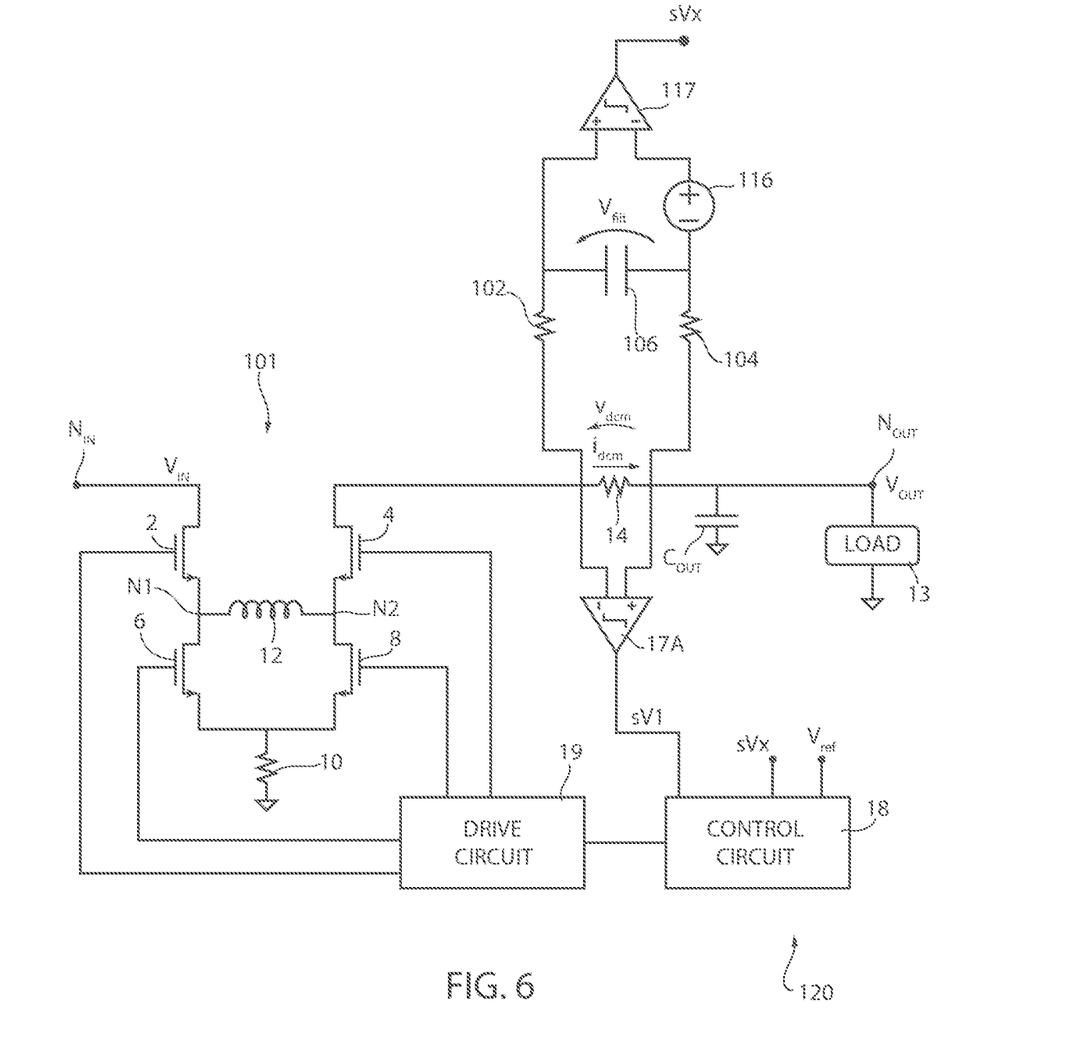
FIG. 6 shows a circuit diagram of a converter including a controller in accordance with one or more embodiments of the present disclosure.

This having been said, the control module is now described with reference to FIG. 6, which shows a converter 101, which is described limitedly to the differences with respect to the converter 1. Components already present in the converter 1 are indicated with the same reference numbers, except where otherwise specified.

In detail, the second shunt resistor 15 is absent, therefore the first terminal of the capacitor $C_{OUT}$ forms the output node Noor, whereto the load 13 is connected.

The control module (indicated with 120) comprises a first and a second filtering resistor 102, 104 and a filtering capacitor 106.

The first and the second terminals of the first filtering resistor 102 are connected respectively to the first terminal of the first shunt resistor 14 and to a first terminal of the filtering capacitor 106. The first and the second terminals of the second filtering resistor 104 are respectively connected to the second terminal of the first shunt resistor 14 and to a second terminal of the filtering capacitor 106.

The voltage generator, indicated with 116, has the negative terminal connected to the second terminal of the filtering capacitor 106 and has the positive terminal connected to the negative input of the second comparator, indicated here with 117. The positive input of the second comparator 117 is connected to the first terminal of the filtering capacitor 106.

Purely by way of example, the resistance of the first shunt resistor 14 may be comprised between 1 mΩ and 5 mΩ.

In practice, the first and the second filtering resistors 102, 104 and the filtering capacitor 106 form a low-pass filter of the analog type, whose time constant $\tau_x$ is equal to $2*R_x*C_x$ (wherein $R_x$ indicates the resistance of each of the first and the second filtering resistors 102, 104, which are equal to each other, while $C_x$ indicates the capacitance of the filtering capacitor 106). For example, the resistance $R_x$ may be of the order of megohms (for example, 2 MΩ).

The aforementioned low-pass filter is then applied to the voltage $v_{dcm}$, so that a filtered voltage $V_{filt}$ is present on the filtering capacitor 106 (by way of example, it is assumed that the filtered voltage $V_{filt}$ is positive if the voltage on the first terminal of the filtering capacitor 106 is greater than the voltage on the second terminal of the filtering capacitor 106).

In greater detail, the resistance $R_x$ and the capacitance $C_x$ may be chosen so that the time constant $\tau_x$ is for example equal to k times the switching period, with k at least equal to four (for example, k may be equal to ten or thirty). For example, the capacitance $C_x$ may be of the order of tens of picofarads (for example, 40 pF); the time constant $\tau_x$ may be of the order of tens of microseconds (for example, 80 μs), with a switching period for example equal to 8 μs.

Figure 7:
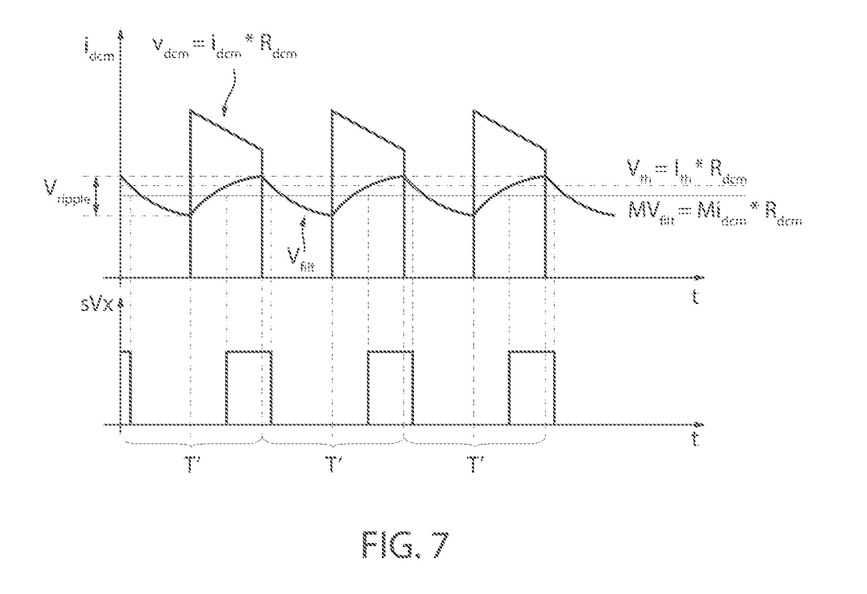

Since the time constant $\tau_x$ is significantly greater than the switching period, the filtered voltage $V_{filt}$ has a trend of the type shown in FIG. 7; in particular, at steady state, the filtered voltage $V_{filt}$ has a ripple around an average value $MV_{filt}$, which is equal to the average value of the voltage $v_{dcm}$, which is equal to the product $i_{dcm}*R_{dcm}$. The average value $MV_{filt}$ is therefore equal to the product of the resistance $R_{dcm}$ by the average value of the current $i_{dcm}$ during each switching period, which hereinafter is referred to as the average value $Mi_{dcm}$. Furthermore, the amplitude of the ripple of the filtered voltage $V_{filt}$ decreases as the ratio between the time constant $\tau_x$ and the switching period increases.

At the input of the second comparator 117 a voltage $V_{filt}-V_{th}$ is present. Furthermore, the second comparator 117 generates a signal sVx, which is of the logic type and is indicative of the fact that the filtered voltage $V_{filt}$ is greater or lower than the voltage $V_{th}$.

In greater detail, the signal sVx assumes a first or a second logic value, depending on whether the filtered voltage $V_{filt}$ is greater or lower than the voltage $V_{th}$. For example, the signal sVx is equal to '1' or '0', when the filtered voltage $V_{filt}$ is respectively higher or lower than the voltage $V_{th}$.

In even more detail, indicating with $V_{ripple}$ the peak-to-peak amplitude of the ripple, the following occurs.

If $MV_{filt}+0.5*V_{ripple}<V_{th}$, the signal sVx is equal to '0' throughout the entire duration of the switching period; if $MV_{filt}-0.5*V_{ripple}>V_{th}$, the signal sVx is equal to '1' throughout the entire duration of the switching period; if, as in the example shown in FIGS. 7, $V_{th}-0.5*V_{ripple}<MV_{filt}<V_{th}+0.5*V_{ripple}$, during each switching period the signal sVx assumes both the value '0' and the value '1', with a duty cycle which increases as $MV_{filt}$ increases and is equal to 50% when $MV_{filt}=V_{th}$.

Equivalently, indicating with $I_{ripple}$ the ratio $V_{ripple}/R_{dcm}$ and indicating with $I_{th}$ the ratio $V_{th}/R_{dcm}$ (which is hereinafter referred to as the overcurrent threshold), the following occurs.

If $Mi_{dcm}+0.5*I_{ripple}<I_{th}$, the signal sVx is equal to '0' throughout the entire duration of the switching period; if $Mi_{dcm}-0.5*I_{ripple}>I_{th}$, the signal sVx is equal to '1' throughout the entire duration of the switching period; if $I_{th}-0.5*I_{ripple}<Mi_{dcm}<I_{th}+0.5*I_{ripple}$, during each switching period the signal sVx assumes both the value '0' and the value '1', with a duty cycle that increases as the average value $Mi_{dcm}$ increases and is equal to 50% when $Mi_{dcm}=I_{th}$.

As regards, instead, the signal sV1 generated by the first comparator 17A, it is assumed that it is, for example, equal to '0' or '1', when the voltage $v_{dcm}$ is respectively positive (therefore the current $i_{dcm}$ is positive) or negative (therefore the current $i_{dcm}$ is negative).

Figure 8:
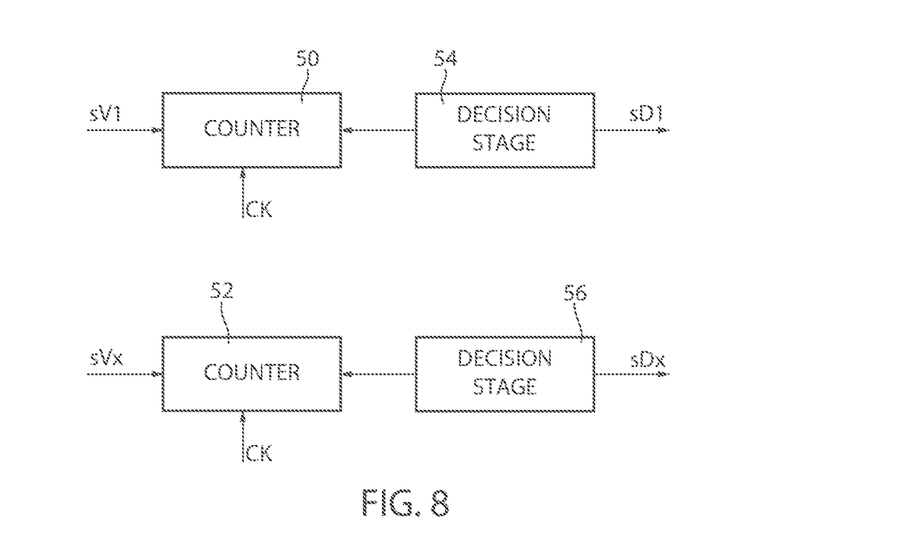
FIG. 8 shows a block diagram of a portion of the controller, in accordance with one or more embodiments.

As shown in FIG. 8, the control circuit 18 implements a first and a second counter circuit 50, 52 and a first and a second decision circuit 54, 56 (which may be referred to herein as a first and a second decision stage 54, 56).

In detail, the first counter circuit 50 is connected to the output of the first comparator 17A, so as to receive the signal sV1 at input. The second counter circuit 52 is connected to the output of the second comparator 117, so as to receive the signal sVx at input.

Furthermore, each of the first and the second counter circuits 50, 52 also receives at input a timing signal CK, which, although not shown in detail, is generated by the control circuit 18, so that it has a respective frequency higher (for example, at least four times higher) than the switching frequency. For example, the timing signal CK may have a frequency equal to 10 MHz.

In use, referring for example to the first counter circuit 50, at each pulse of the timing signal CK the first counter circuit 50 increases or decreases a respective stored value, respectively if, when for example there occurs the rising edge (but similar considerations apply in case the falling edge is used as a reference) of the pulse of the timing signal CK, the signal sV1 is respectively equal to '1' or '0'. In practice, the first counter circuit 50 samples the signal sV1 as a function of the timing signal CK and increases/decreases its value accordingly.

Furthermore, at each pulse of the timing signal CK, the second counter circuit 52 increases or decreases a respective stored value, respectively if, when for example there occurs the rising edge (but similar considerations apply in case the falling edge is used as a reference) of the pulse of the timing signal CK, the signal sVx is respectively equal to '1' or '0'. In practice, the second counter circuit 52 samples the signal sVx as a function of the timing signal CK and increases/decreases its value accordingly.

The first decision stage 54 is coupled to the first counter circuit 50 and is configured to generate a signal sD1, which is indicative of the possible exceeding, by the value stored in the first counter circuit 50, of a first numerical threshold NUM1. In particular, the value stored in the first counter circuit 50 exceeds the first numerical threshold NUM1 if the signal sV1 has remained equal to '1', that is, if the voltage $v_{dcm}$ has remained negative (equivalently, the current $i_{dcm}$ has remained negative), for a time period at least equal to a time threshold TTH1 equal to $NUM1/f_{CK}$, wherein $f_{CK}$ represents the frequency of the timing signal CK.

In order to reduce the delay of the turning off of the second top transistor 4 following the cancellation of the current $I_L$, the first numerical threshold NUM1 and the frequency $f_{CK}$ may be set so that the time threshold TTH1 has a duration not greater than (for example) 0.5 μs. In this manner, the first decision stage 54 detects the occurrence of the cancellation of the current $I_L$ with an extremely reduced delay, allowing the control circuit 18 to correctly control the converter 101, on the basis of the signal sD1. Furthermore, the first counter circuit 50 acts as a filter for possible glitches that may be present on the signal sV1, without introducing a delay which might jeopardize the rapid turning off of the second top transistor 4. Although not shown, variants are still possible wherein, in lieu of the first counter circuit 50 and the first decision stage 54, an asymmetrical analog filter is implemented, which generates the signal sD1. In particular, the output of the asymmetrical analog filter switches from '0' to '1' if the signal sV1 has remained equal to '1' for a period equal to a first threshold period and switches from '1' to '0' if the signal sV1 has remained equal to '0' for a period equal to a second threshold period, which is lower than the first threshold period.

The second decision stage 56 is coupled to the second counter circuit 52 and is configured to generate a signal sDx, which is indicative of the possible exceeding, by the value stored in the second counter circuit 52, of a second numerical threshold NUM2. In particular, at steady state, the value stored in the second counter circuit 52 exceeds the second numerical threshold NUM2 if, during each switching period, the duty cycle of the signal sVx is greater than 50%, i.e. if the aforementioned average value $Mi_{dcm}$ of the current $i_{dcm}$ exceeds the overcurrent threshold $I_{th}$; furthermore, with respect to the instant when the condition $Mi_{dcm}>I_{th}$ occurred, the second numerical threshold NUM2 is reached with a delay that decreases as the duty cycle of the signal sVx increases.

For example, in case, at a given time instant, a transition occurs from a condition $Mi_{dcm}<I_{th}-0.5*I_{ripple}$ to a condition $Mi_{dcm}>I_{th}+0.5*I_{ripple}$, such that the duty cycle of the signal sVx is equal to 100%, the value stored in the second counter circuit 52 reaches the second numerical threshold NUM2 after a time TTH2 equal to $NUM2/f_{CK}$; for example, the second numerical threshold NUM2 may be set so that the time TTH2 has a duration of the order of microseconds (for example, 7 μs).

In practice, the second counter circuit 52 acts as a filter for possible glitches that may be present on the signal sVx, so as to increase the accuracy of the detection of a possible overcurrent, and in particular so as to average the oscillations of the signal sVx which occur when the average value $Mi_{dcm}$ of the current $i_{dcm}$ is close to the overcurrent threshold $I_{th}$.

The control circuit 18 may therefore implement protection mechanisms of a per se known type, which are activated when the signal sDx indicates that an overcurrent has occurred.

The advantages that the present control module affords are clear from the previous description.

In particular, the present control module allows removing one of the two shunt resistors used to implement the detection of the overcurrent and the cancellation of the current that flows in the inductor when the converter operates in DCM mode. This allows costs, area occupation, consumption and the number of pins of the relative package to be reduced.

In addition, although the preceding description has referred to the case in which the converter 101 operates in boost mode, the aforementioned advantages are also obtained when the converter 101 operates in the buck mode. In this case, the current $i_{dcm}$ that flows in the first shunt resistor 14 coincides with the current $I_L$ throughout the entire duration of each switching period. The average of the current $i_{dcm}$ is still equal to the current $I_{LOAD}$. Furthermore, following the detection of the cancellation of the current $i_{dcm}$, the control circuit 18 controls the turning off of the second bottom transistor 6.

Finally, it is clear that modifications and variations may be made to the control module described and illustrated herein without thereby departing from the scope of the present disclosure.

For example, the first and the second top transistors 2, 4 and the first and the second bottom transistors 6, 8 may be integrated with the control module 120 or be external.

Transistors of a different type with respect to what has been described may also be used.

The voltage generator 116 may have a different arrangement with respect to what has been described. For example, although not shown, the voltage generator 116 may be connected between the first terminal of the filtering capacitor 106 and the positive input of the second comparator 117 (with the positive terminal connected to the first terminal of the filtering capacitor 106).

Figure 9:
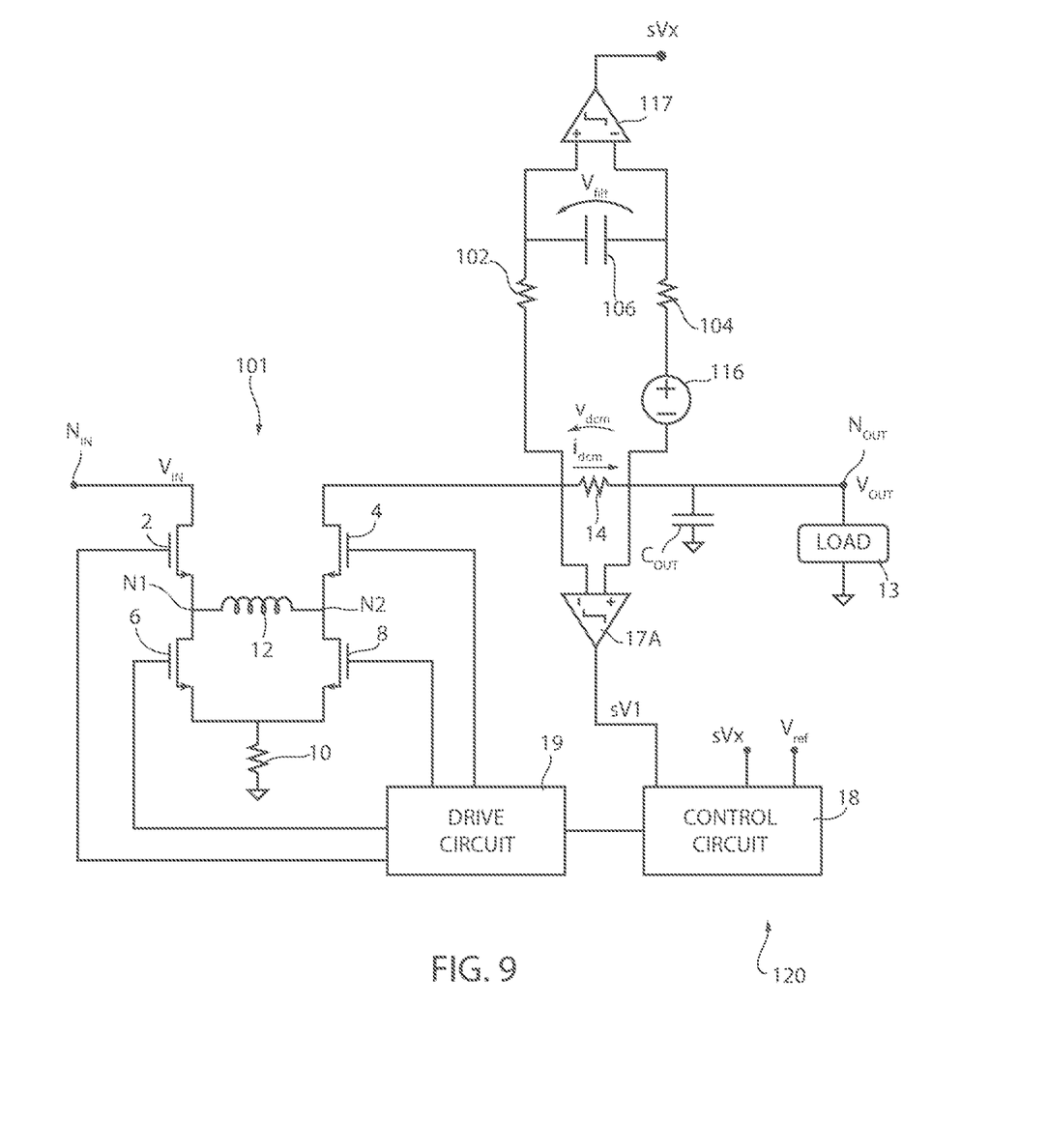
FIG. 9 shows a circuit diagram of a variant of the converter shown in FIG. 6, in accordance with one or more embodiments.

The voltage generator 116 may also be arranged between the first shunt resistor 14 and the low-pass filter, as shown for example in FIG. 9. In this example, the first and the second terminals of the second filtering resistor 104 are connected respectively to the positive terminal of the voltage generator 116 and to the second terminal of the filtering capacitor 106; the negative terminal of the voltage generator 116 is connected to the second terminal of the first shunt resistor 14. The positive and negative input terminals of the second comparator 117 are connected respectively to the first and the second terminals of the filtering capacitor 106.

Similarly, although not shown, the voltage generator 116 may be connected between the first terminal of the first shunt resistor 14 and the first filtering resistor 102, in which case the positive terminal of the voltage generator 16 is connected to the first terminal of the shunt resistor 14.

What is claimed is:

1. A controller for a buck-boost switching converter having, an inductor, a capacitor, a shunt resistor, and switches, the controller comprising:
   a control circuit configured to control the switches to perform charge and discharge cycles of the inductor, during which the shunt resistor is traversed by a resistor current, the resistor current having an average value that is equal to a load current of the buck-boost switching converter;
   a first comparator configured to couple to the shunt resistor and generate a first signal indicative of a direction of the resistor current, wherein the control circuit controls the switches based on the first signal; and
   an overcurrent detection circuit, including:
      a low-pass filtering circuit couplable to the shunt resistor and configured to generate a filtered electrical quantity based on a voltage at the shunt resistor;
      a second comparator configured to generate a second signal having a first logic value and a second logic value, respectively, in response to the filtered electrical quantity being greater than or less than a reference electrical quantity; and
   wherein the control circuit comprises:
      a detection circuit having a counter configured to sample the second signal and increase or decrease a respective value in response to the sampling being equal to the first logic value or the second logic value, respectively, and
      a decision circuit configured to compare a value of the counter with a threshold and detect an overcurrent occurrence based on a comparison of a value of the counter with a threshold.

2. The controller according to claim 1, wherein, during each charge and discharge cycle of the inductor, the filtered electrical quantity has a respective average value, which is a function of the average value of the resistor current.

3. The controller according to claim 1, wherein each charge and discharge cycle has a duration equal to a switching period, the low-pass filtering circuit has a time constant equal to at least four times the switching period, and the filtered electrical quantity has a ripple with an amplitude that decreases as the time constant increases.

4. The controller according to claim 1, wherein the low-pass filtering circuit comprises a first filtering resistor and a second filtering resistor, which are coupled to the shunt resistor, and a filtering capacitor, which is coupled to the first and the second filtering resistors, and wherein the filtered electrical quantity is a voltage on the filtering capacitor.

5. The controller according to claim 1, wherein the first signal is indicative, for each charge and discharge cycle, of a cancellation of the resistor current during the discharge.

6. The controller according to claim 1, wherein the first comparator is configured to generate the first signal based on the voltage at the shunt resistor.

7. An electronic system, comprising:
   a buck-boost switching converter, including:
      an inductor;
      a capacitor;
      a shunt resistor; and
      a plurality of switches; and
   a controller, including:
      a control circuit configured to control the switches to perform charge and discharge cycles of the inductor, during which the shunt resistor is traversed by a resistor current, the resistor current having an average value that is equal to a load current of the buck-boost switching converter;
      a first comparator configured to couple to the shunt resistor and generate a first signal indicative of a direction of the resistor current, wherein the control circuit controls the switches based on the first signal; and
      an overcurrent detection circuit, including:
         a low-pass filtering circuit couplable to the shunt resistor and configured to generate a filtered electrical quantity based on a voltage at the shunt resistor;
         a second comparator configured to generate a second signal having a first logic value and a second logic value, respectively, in response to the filtered electrical quantity being greater than or less than a reference electrical quantity; and wherein the control circuit comprises:

a detection circuit having a counter configured to sample the second signal and increase or decrease a respective value in response to the sampling being equal to the first logic value or the second logic value, respectively, and a decision circuit configured to compare a value of the counter with a threshold and detect an overcurrent occurrence based on a comparison of a value of the counter with a threshold.

8. The electronic system according to claim 7, wherein, during each charge and discharge cycle of the inductor, the filtered electrical quantity has a respective average value, which is a function of the average value of the resistor current.

9. The electronic system according to claim 7, wherein each charge and discharge cycle has a duration equal to a switching period, the low-pass filtering circuit has a time constant equal to at least four times the switching period, and the filtered electrical quantity has a ripple with an amplitude that decreases as the time constant increases.

10. The electronic system according to claim 7, wherein the low-pass filtering circuit comprises a first filtering resistor and a second filtering resistor, which are coupled to the shunt resistor, and a filtering capacitor, which is coupled to the first and the second filtering resistors, and wherein the filtered electrical quantity is a voltage on the filtering capacitor.

11. The electronic system according to claim 7, wherein the first signal is indicative, for each charge and discharge cycle, of a cancellation of the resistor current during the discharge.

12. The electronic system according to claim 7, wherein the first comparator is configured to generate the first signal based on the voltage at the shunt resistor.

13. A method for controlling a buck-boost switching converter having an inductor, a capacitor, a shunt resistor, and switches, the method comprising:

controlling the switches to perform charge and discharge cycles of the inductor, during which the shunt resistor is traversed by a resistor current, the resistor current having an average value that is equal to a load current of the buck-boost switching converter ;

generating a first signal indicative of a direction of the resistor current, wherein controlling the switches comprises controlling the switches based on the first signal;

generating a filtered electrical quantity based on a voltage at the shunt resistor;

generating a second signal having a first logic value and a second logic value, respectively, in response to the filtered electrical quantity being greater than or less than a reference electrical quantity;

sampling the second signal and increasing or decreasing a respective value of a counter in response to the sampling being equal to the first logic value or the second logic value, respectively; and detecting an overcurrent occurrence based on a comparison of a value of the counter with a threshold.

14. The method according to claim 13, wherein, during each charge and discharge cycle of the inductor, the filtered electrical quantity has a respective average value, which is a function of the average value of the resistor current.

15. The method according to claim 13, wherein each charge and discharge cycle has a duration equal to a switching period, wherein the filtered electrical quantity is generated by a low-pass filtering circuit with a time constant equal to at least four times the switching period, and the filtered electrical quantity has a respective ripple with an amplitude that decreases as the time constant increases.

16. The method according to claim 13, wherein the first signal is indicative, for each charge and discharge cycle, of a cancellation of the resistor current during the discharge.

17. The method according to claim 13, comprising generating the first signal based on the voltage at the shunt resistor.

18. The method of claim 13, wherein the buck-boost switching converter further comprises:

an input node for receiving an input voltage; and an output node couplable to the load, the output node drawing a load current in response to the load, wherein the switches include a first top switch and a second top switch and a first bottom switch and a second bottom switch, the first top switch and the first bottom switch are coupled in series at a first internal node, the second top switch and the second bottom switch are coupled in series at a second internal node, the first and the second top switches are coupled respectively to the input node and a first terminal of the shunt resistor, wherein the inductor is coupled to the first and the second internal nodes, wherein a second terminal of the shunt resistor is coupled to the output node, and wherein the capacitor is coupled to the output node.

19. The controller according to claim 1, wherein the buck-boost switching converter further comprises:

an input node for receiving an input voltage; and an output node couplable to the load, the output node drawing a load current in response to the load, wherein the switches include a first top switch and a second top switch and a first bottom switch and a second bottom switch, the first top switch and the first bottom switch are coupled in series at a first internal node, the second top switch and the second bottom switch are coupled in series at a second internal node, the first and the second top switches are coupled respectively to the input node and a first terminal of the shunt resistor, wherein the inductor is coupled to the first and the second internal nodes, wherein a second terminal of the shunt resistor is coupled to the output node, and wherein the capacitor is coupled to the output node.

20. The electronic system according to claim 7, wherein the buck-boost switching converter further comprises:

an input node for receiving an input voltage; and an output node couplable to the load, the output node drawing a load current in response to the load, wherein the switches include a first top switch and a second top switch and a first bottom switch and a second bottom switch, the first top switch and the first bottom switch are coupled in series at a first internal node, the second top switch and the second bottom switch are coupled in series at a second internal node, the first and the second top switches are coupled respectively to the input node and a first terminal of the shunt resistor, wherein the inductor is coupled to the first and the second internal nodes,
wherein a second terminal of the shunt resistor is coupled to the output node, and
wherein the capacitor is coupled to the output node.

\* \* \* \* \*